United States Patent
Dain et al.

(10) Patent No.: US 10,430,602 B2
(45) Date of Patent: Oct. 1, 2019

(54) TAPE PROCESSING OFFLOAD TO OBJECT STORAGE

(71) Applicant: International Business Machines Corporation, Armonk, NY (US)

(72) Inventors: Joseph W. Dain, Vail, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/382,397

(22) Filed: Dec. 16, 2016

(65) Prior Publication Data

US 2018/0173423 A1  Jun. 21, 2018

(51) Int. Cl.
| | |
|---|---|
| G06F 21/00 | (2013.01) |
| G06F 21/62 | (2013.01) |
| G06F 3/06 | (2006.01) |
| H04L 29/06 | (2006.01) |
| G06F 21/79 | (2013.01) |

(52) U.S. Cl.
CPC ........ *G06F 21/6218* (2013.01); *G06F 3/0605* (2013.01); *G06F 3/0607* (2013.01); *G06F 3/067* (2013.01); *G06F 3/0649* (2013.01); *G06F 3/0655* (2013.01); *G06F 3/0682* (2013.01); *G06F 3/0685* (2013.01); *G06F 21/79* (2013.01); *H04L 63/08* (2013.01); *H04L 63/10* (2013.01); *H04L 63/101* (2013.01)

(58) Field of Classification Search
None
See application file for complete search history.

(56) References Cited

U.S. PATENT DOCUMENTS

| | | |
|---|---|---|
| RE36,989 E | 12/2000 | White |
| 7,580,950 B2 | 8/2009 | Kavuri et al. |
| 7,814,074 B2 | 10/2010 | Anglin et al. |
| 7,840,723 B1 | 11/2010 | Kemkar |
| 8,316,259 B2 | 11/2012 | Winarski et al. |
| 8,458,422 B1 | 6/2013 | Holdman et al. |
| 8,583,680 B2 | 11/2013 | Hoang |
| 9,053,339 B2 | 6/2015 | Pate et al. |
| 9,164,921 B2 | 10/2015 | Bish et al. |

(Continued)

FOREIGN PATENT DOCUMENTS

| | | |
|---|---|---|
| CN | 101639835 A | 2/2010 |
| CN | 103218175 A | 7/2013 |

(Continued)

OTHER PUBLICATIONS

International Search Report and Written Opinion from PCT Application No. PCT/IB2017/057099, dated Mar. 7, 2018.

(Continued)

*Primary Examiner* — Andrew J Steinle
(74) *Attorney, Agent, or Firm* — Zilka-Kotab, P.C.

(57) ABSTRACT

A computer-implemented method, according to one embodiment, includes: receiving a data volume having data from multiple tenants therein; separating data in the data volume into objects using tenant identifiers from metadata corresponding to portions of the data, wherein each object corresponds to a respective tenant; and storing the objects in object storage. Other systems, methods, and computer program products are described in additional embodiments.

16 Claims, 8 Drawing Sheets

(56) References Cited

U.S. PATENT DOCUMENTS

| | | | |
|---|---|---|---|
| 9,398,016 B1* | 7/2016 | Chakraborty | H04L 63/10 |
| 9,430,490 B1* | 8/2016 | Lewis | G06F 17/30156 |
| 2004/0044830 A1* | 3/2004 | Gibble | G06F 3/0613 |
| | | | 711/4 |
| 2007/0103984 A1 | 5/2007 | Kavuri et al. | |
| 2007/0208788 A1 | 9/2007 | Chakravarty et al. | |
| 2012/0179646 A1* | 7/2012 | Hinton | G06F 17/30557 |
| | | | 707/607 |
| 2014/0331007 A1* | 11/2014 | Sasaki | G06F 3/0686 |
| | | | 711/113 |
| 2015/0142751 A1* | 5/2015 | Bruce | G06F 17/30575 |
| | | | 707/662 |
| 2016/0162210 A1 | 6/2016 | Bucher et al. | |
| 2016/0334998 A1 | 11/2016 | George et al. | |
| 2018/0176303 A1 | 6/2018 | Dain et al. | |

FOREIGN PATENT DOCUMENTS

| | | |
|---|---|---|
| CN | 104506487 A | 4/2015 |
| WO | 2004107160 A2 | 12/2004 |

OTHER PUBLICATIONS

Dain et al., U.S. Appl. No. 15/382,366, filed Dec. 16, 2016.
List of IBM Patents or Patent Applications Treated As Related.
Coyne et al., "IBM Linear Tape File System Enterprise Edition V1.1.1.2 Installation and Configuration Guide," IBM Redbooks, Jan. 2015, 332 pages.
Coyne et al., "IBM Tape Library Guide for Open Systems," IBM Redbooks, Aug. 2016, pp. 1-478.
Open Stack, Cloud Software, "Large Object Support," May 21, 2016, pp. 1-6, Retrieved From http://docs.openstack.org/developer/swift/overview_large_objects.html.
IBM Developer Works, "Swift Storlets," Apr. 10, 2016, pp. 1, Retrieved From https://developer.ibm.com/open/swift-storlets/.
IBM Research Blog, "Storlets: Turning Object Storage into a Smart Storage Platform," May 12, 2014, pp. 1-2, Retrieved From https://www.ibm.com/blogs/research/2014/05/storlets-turning-object-storage-into-a-smart-storage-platform/.
IBM Storage Research, "Preservation DataStores and Storlet Engine," Sep. 21, 2015, pp. 1, Retrieved From https://www.research.ibm.com/haifa/projects/storage/datastores/storlet_engine.html.
IBM Knowledge Center, "Unified_Mode—unified identity between object and file," Aug. 1, 2016, pp. 1-3, Retrieved From http://www.ibm.com/support/knowledgecenter/STXKQY_4.2.0/com.ibm.spectrum.scale.v4r2.adm.doc/bl1adm_unifiedidmode.htm.
Yost, "Easing Access to Mainframe Data for Business Analytics," Enterprise Executive, Sep./Oct. 2015, pp. 26-30.
Information Technology Labaratory, "NIST Cloud Computing Program," Jul. 29, 2016, pp. 1-3, Retrieved From http://www.nist.gov/itl/cloud/.
Mell et al., "The NIST Definition of Cloud Computing," NIST, Information Technology Laboratory, Version 15, Oct. 7, 2009, pp. 1-2.
Mell et al., "The NIST Definition of Cloud Computing," NIST, Special Publication 800-145, 2011, pp. 1-7.
Shah, "Near Real-Time Log Data Using DLM," American Express, 2012, pp. 1-11.
IBM Knowledge Center, "Administering Storage Policies for Object Storage," Aug. 1, 2016, pp. 1, Retrieved From https://www.ibm.com/support/knowledgecenter/STXKQW420/com.ibm.spectrum.scale.v4r2.ins.doc/bl1ins_storagepoliciesforobject.htm.
Non-Final Office Action from U.S. Appl. No. 15/382,366, dated Jan. 11, 2019.
Final Office Action from U.S. Appl. No. 15/382,366, dated Jul. 5, 2019.
Dain et al., U.S. Appl. No. 16/513,078, filed Jul. 16, 2019.

* cited by examiner

TAPE PROCESSING OFFLOAD TO OBJECT STORAGE

BACKGROUND

The present invention relates to data storage, and more specifically, this invention relates to managing data storage across a connected data storage system.

Traditional computer file systems store information in a database using a tree structure. These traditional systems have been successful for small collections of data such as those on a local hard drive, but were not designed, and therefore not able, to handle larger amounts of data. Thus, as businesses continue to collect, store, access, transfer, etc. larger and larger volumes of unstructured content, traditional computer file systems are unable to meet business' needs.

A storage area network (SAN) is a network which provides access to consolidated, block level data storage. SANs are primarily used to enhance storage devices such as disk arrays and tape libraries by making them accessible to servers so that the devices appear to the operating system as locally attached devices. Accordingly, storage devices having differing levels of processing power may collectively be used to manage the data included in a data storage system. Moreover, SANs may be implemented over a wide area network (WAN) that covers a broad geographical area. Physical data storage infrastructure included in a SAN may even be integrated with a cloud-based network. Thus, access between storage devices may be facilitated regardless of their proximity to each other.

Object storage provides an advanced technique of storing information, where information is stored as objects. Each object contains the data itself (e.g., the bits and bytes), in addition to metadata that may include user and/or system defined tags. The metadata may describe the content of the data; how the corresponding object is related to other objects; how the data should be handled, replicated, or backed up; etc.

Although data processing devices having differing levels of processing power may be used collectively, existing data storage systems are unable to efficiently utilize the varied throughputs to perform data processing.

SUMMARY

A computer-implemented method, according to one embodiment, includes: receiving a data volume having data from multiple tenants therein; separating data in the data volume into objects using tenant identifiers from metadata corresponding to portions of the data, wherein each object corresponds to a respective tenant; and storing the objects in object storage.

A computer program product, according to another embodiment, includes a computer readable storage medium having program instructions embodied therewith, the program instructions executable by a processor to cause the processor to: receive, by the processor, a data volume having data from multiple tenants therein; separate, by the processor, data in the data volume into objects using tenant identifiers from metadata corresponding to portions of the data, wherein each object corresponds to a respective tenant; and store, by the processor, the objects in object storage.

A system, according to yet another embodiment, includes: a processor; and logic integrated with the processor, executable by the processor, or integrated with and executable by the processor, the logic being configured to: receive a data volume having data from multiple tenants therein; separate data in the data volume into objects using tenant identifiers from metadata corresponding to portions of the data, wherein each object corresponds to a respective tenant; and store the objects in object storage.

Other aspects and embodiments of the present invention will become apparent from the following detailed description, which, when taken in conjunction with the drawings, illustrate by way of example the principles of the invention.

DETAILED DESCRIPTION

Figure 1A:
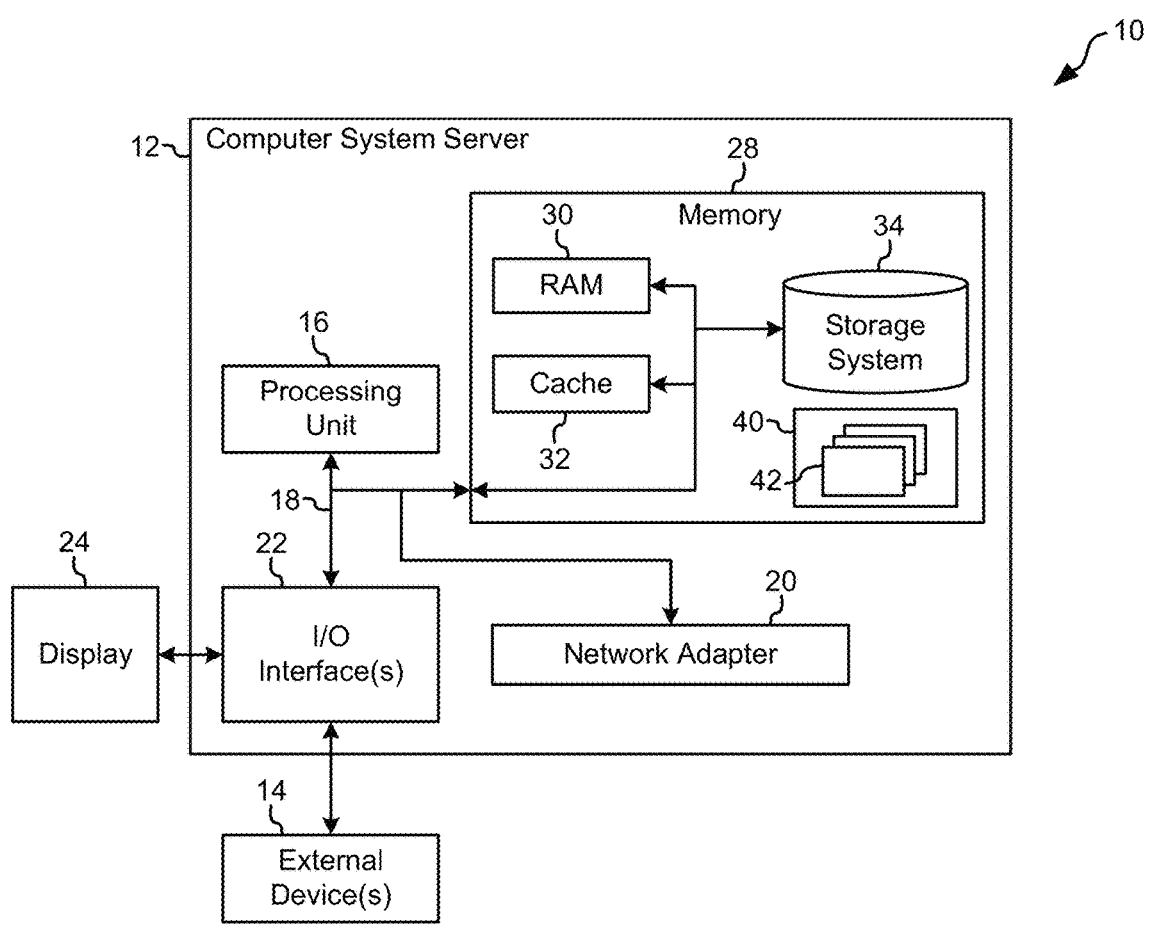
FIG. 1A is a cloud computing node, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing data storage across a connected data storage system. Various embodiments described herein may be able to achieve an efficient use of the varying levels of processing power provided by different devices across a storage network. As a result, system resources may be efficiently used, thereby improving data storage network performance as a whole, as will be described in further detail below.

In one general embodiment, a computer-implemented method includes: receiving a data volume having data from multiple tenants therein; separating data in the data volume into objects using tenant identifiers from metadata corresponding to portions of the data, wherein each object corresponds to a respective tenant; and storing the objects in object storage.

In another general embodiment, a computer program product includes a computer readable storage medium having program instructions embodied therewith, the program instructions executable by a processor to cause the processor to: receive, by the processor, a data volume having data from multiple tenants therein; separate, by the processor, data in the data volume into objects using tenant identifiers from metadata corresponding to portions of the data, wherein each object corresponds to a respective tenant; and store, by the processor, the objects in object storage.

In yet another general embodiment, a system includes: a processor; and logic integrated with the processor, executable by the processor, or integrated with and executable by the processor, the logic being configured to: receive a data volume having data from multiple tenants therein; separate data in the data volume into objects using tenant identifiers from metadata corresponding to portions of the data, wherein each object corresponds to a respective tenant; and store the objects in object storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
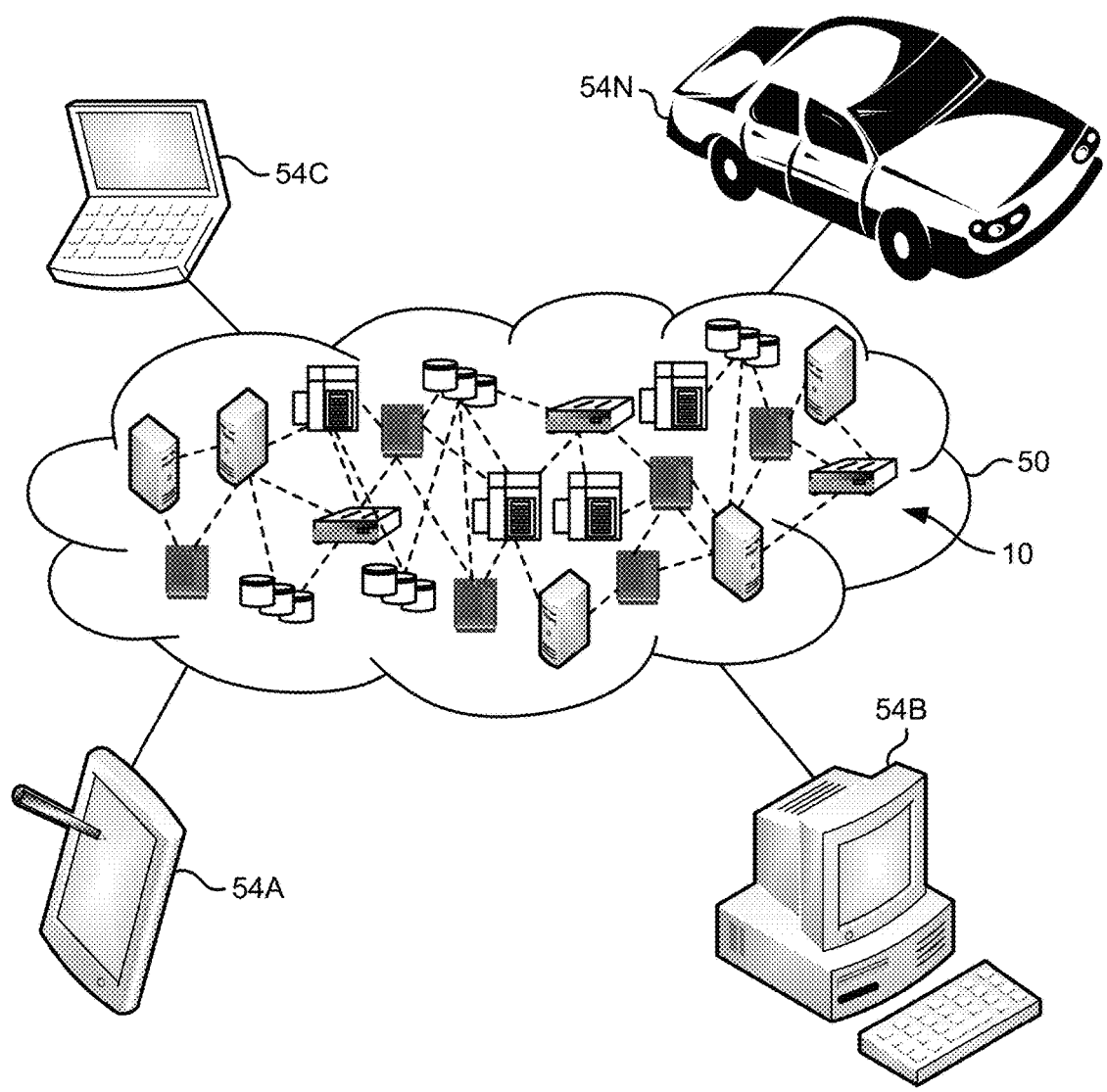
FIG. 1B is a cloud computing environment, in accordance with one embodiment.

Referring now to FIG. 1B, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 2:
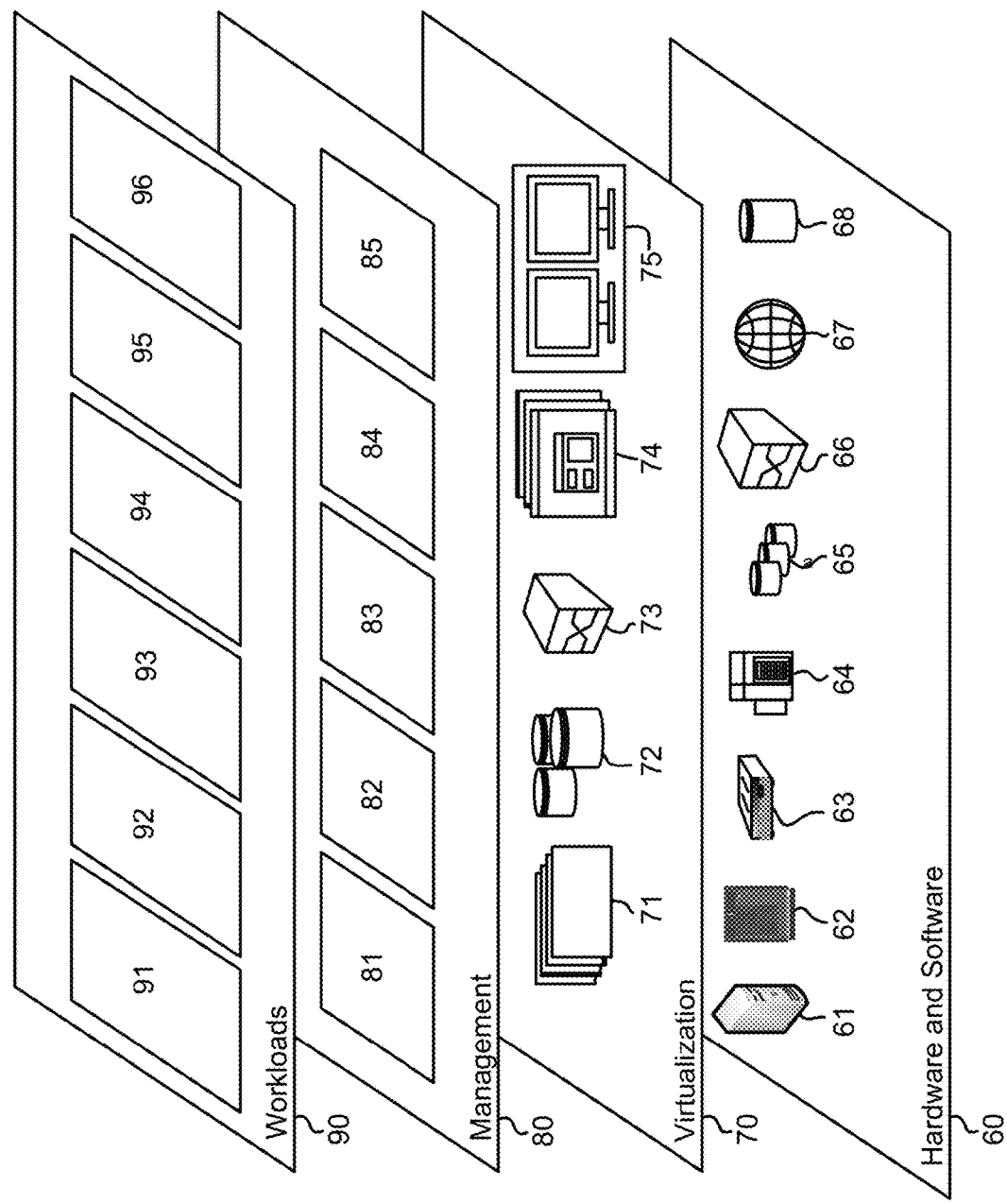
FIG. 2 is a representational view of abstraction model layers, in accordance with one embodiment.

Referring now to FIG. 2, a set of functional abstraction layers provided by cloud computing environment 50 (FIG. 1B) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based distributed system 96, e.g., as will be described in further detail below.

Figure 3:
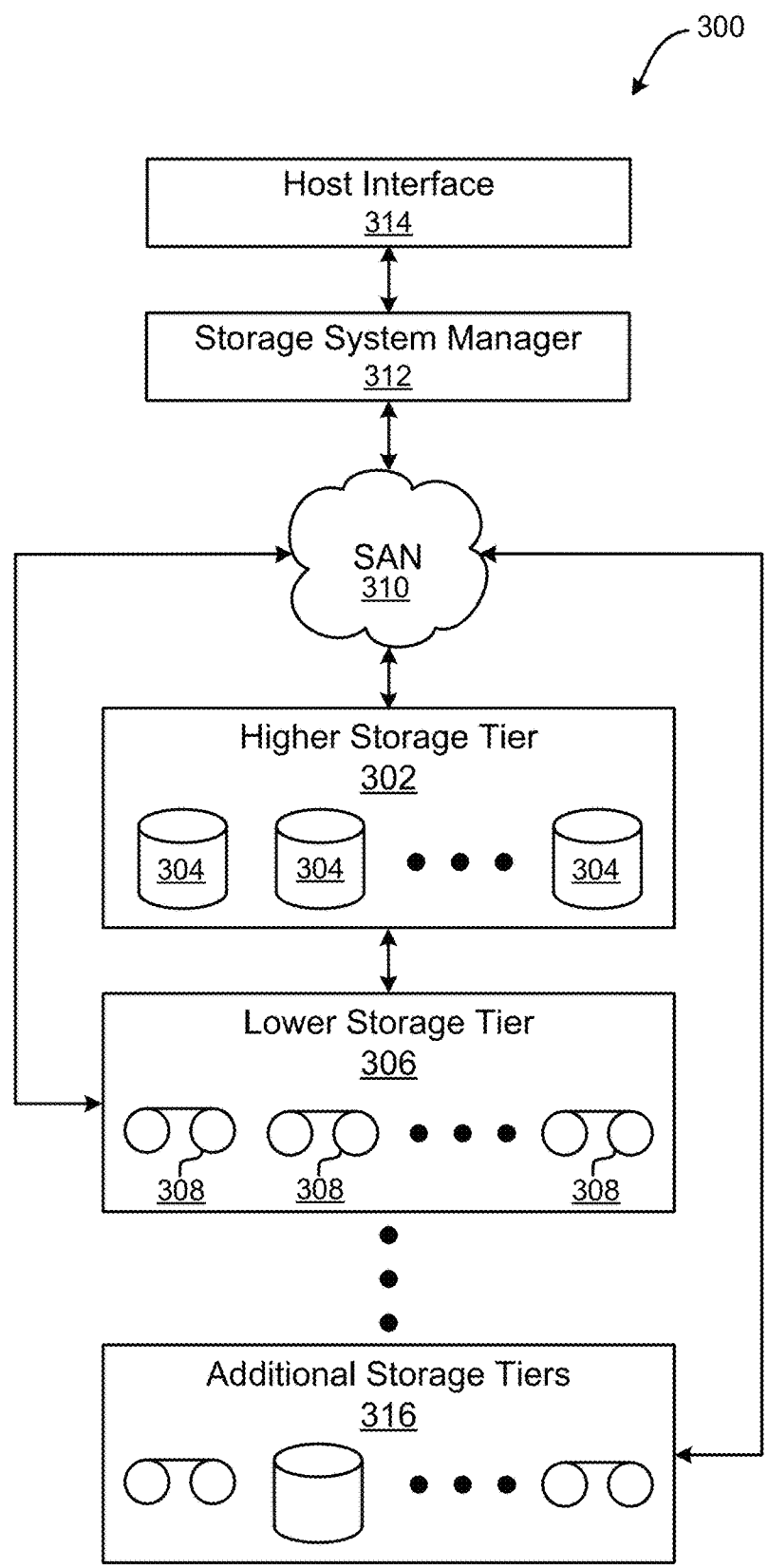
FIG. 3 is a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, although data processing devices having differing levels of processing power (e.g., throughput) may be used collectively, existing data storage systems do not efficiently utilize the varied throughputs thereof. Devices having greater throughput use a greater amount of system resources. For example, mainframe type devices have a vast amount of processing power, but also use a comparable amount of system resources, particularly compared to other distributed devices having lower throughputs. However, when high throughput devices are used to perform non-critical tasks, significant amounts of system resources are used inefficiently.

In sharp contrast, various embodiments described herein may include data storage networks that achieve an efficient use of the varying levels of processing power provided by different devices across the network. As a result, system resources may be conserved and efficiently used, thereby improving data storage network performance as a whole. Moreover, the manner in which data is stored may further improve system performance of data access requests, as will be described in further detail below.

According to some embodiments, offloading data from high throughput devices to perform certain operations on the data may allow for system resources to be used more efficiently. Looking to FIG. 4, a data storage network 400 is illustrated in accordance with one embodiment. As an option, the present data storage network 400 may be implemented in conjunction with features from any other embodiment listed herein, such as those described with reference to the other FIGS. However, such data storage network 400 and others presented herein may be used in various applications and/or in permutations which may or may not be specifically described in the illustrative embodiments listed herein. Further, the data storage network 400 presented herein may be used in any desired environment. Thus FIG. 4 (and the other FIGS.) may be deemed to include any possible permutation.

The data storage network 400 includes a high throughput device 402 which is coupled to a data processing device 404 as well as distributed system 406, which may be cloud-based, WAN based, etc. The distributed system 406 may in turn be coupled to any number of distributed hardware platforms 408 which may operate using any desired operating system. The high throughput device 402 may be a mainframe which receives streams of data from users, tenants, other storage systems and/or networks, etc., and may thereby have a higher throughput than data processing device 404. According to an exemplary approach, which is in no way intended to limit the invention, the high throughput device 402 may be an IBM z Systems mainframe implementing a z/OS, z/TPF, z/VM, z/VSE, etc. operating system. Moreover, according to another approach, the data processing device 404 may be a virtual tape system, e.g., as described above with reference to FIG. 3. It follows that the high throughput device 402 may be used to perform resource intensive data processing operations, while device 404 is used to perform processing operations that are less strenuous.

According to one approach, which is in no way intended to limit the invention, high throughput device 402 may offload non-critical data volume processing to the data processing device 404 and/or other distributed systems or hardware platforms 408 via the distributed system 406. This offloading of data volume processing may be done in order to avoid the unnecessary consumption of system resources associated with performing such processing with the high throughput device 402. Alternatively, the non-critical data volume processing may be performed using a data processing device that consumes less system resources to do so. According to some approaches, data volumes may be moved between locations in the storage system as one or more virtual tape library volume.

According to some embodiments, object storage may be utilized to further improve the manner in which the data may be stored, e.g., after it has been processed. Storing data as objects in object storage may reduce access time and further decrease the risk of data stream contamination, as will be described in further detail below.

Figure 4:
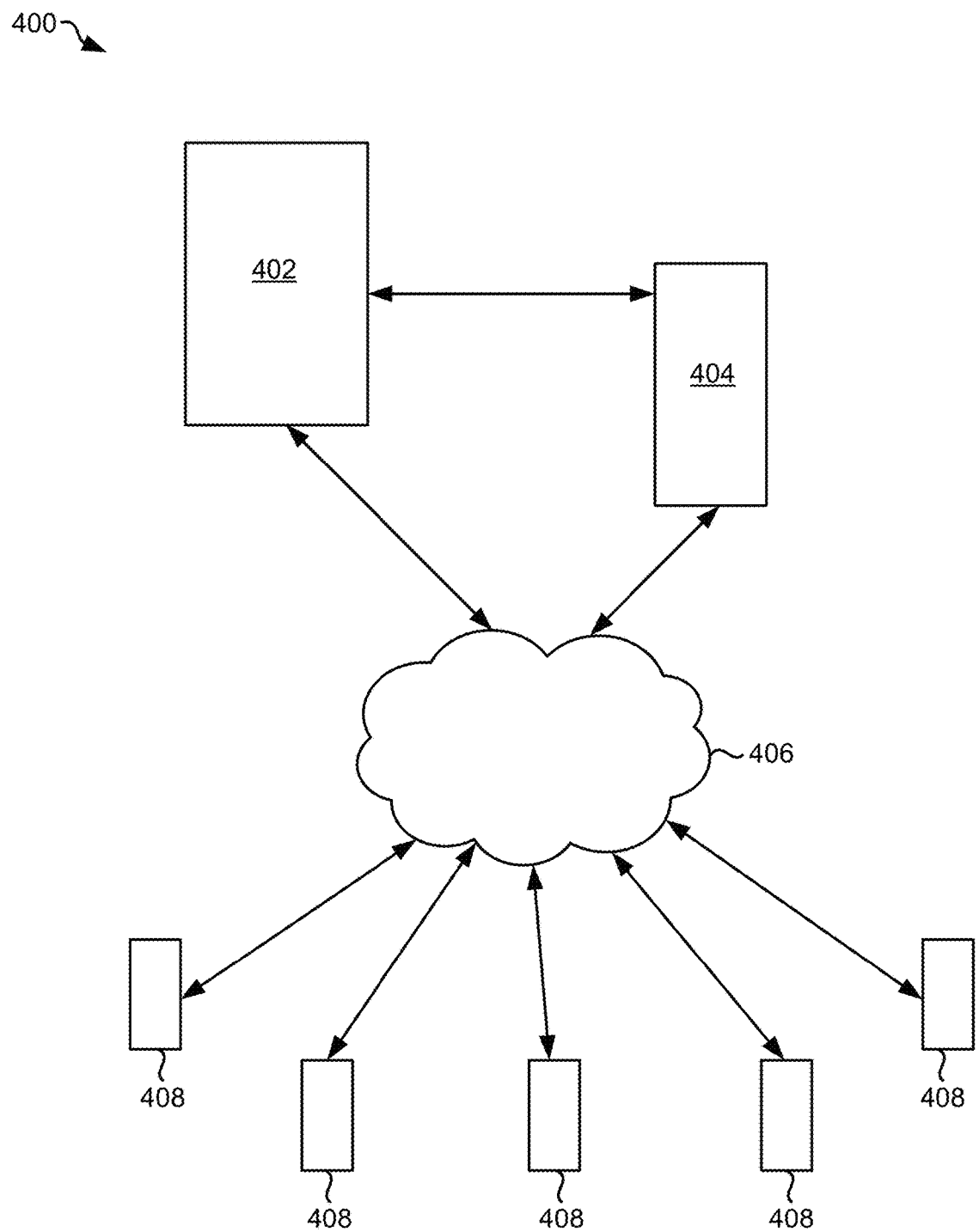
FIG. 4 is a data storage network architecture, in accordance with one embodiment.
Figure 5A:
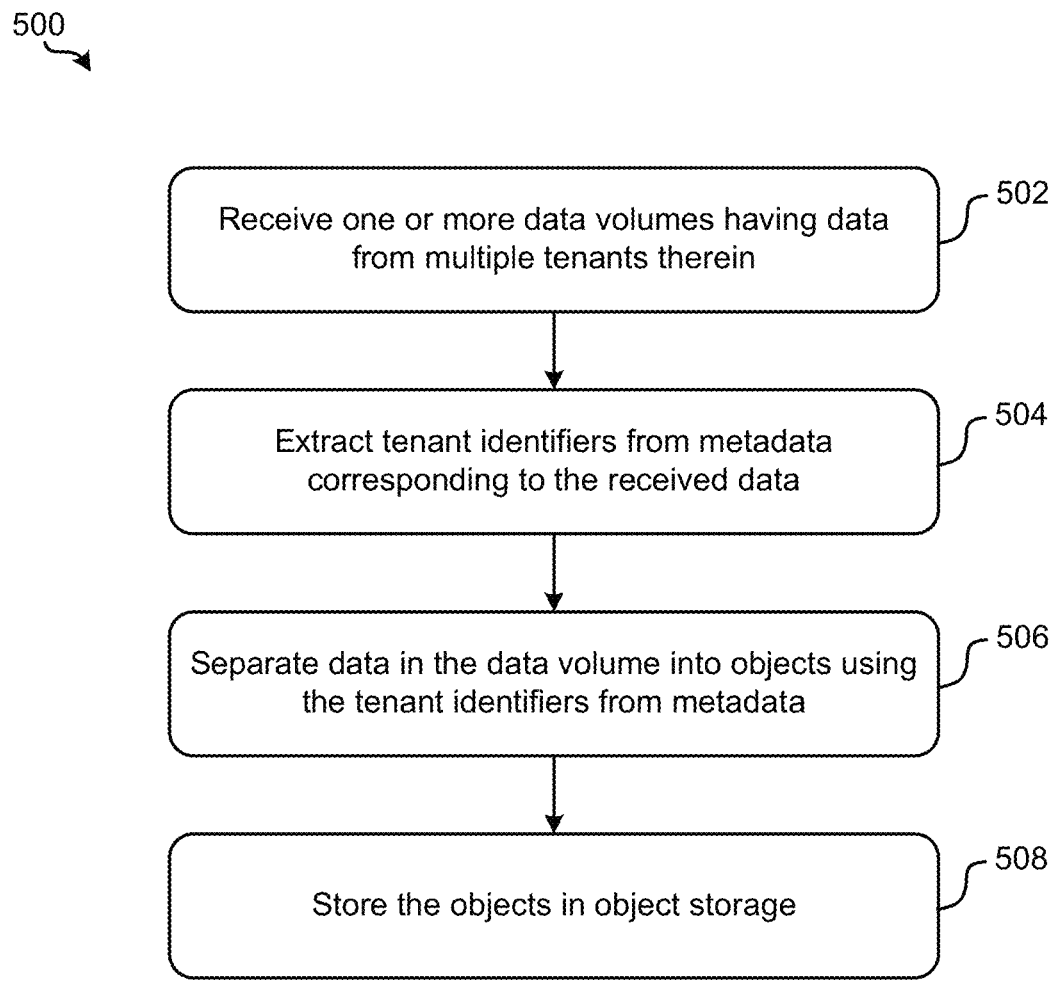
FIG. 5A is a flowchart of a method, in accordance with one embodiment.

Now referring to FIG. 5A, a flowchart of a computer-implemented method 500 is shown according to one embodiment. The method 500 may be performed in accordance with the present invention in any of the environments listed herein, such as those described with reference to the other FIGS., such as FIG. 4. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes receiving one or more data volumes having data from multiple tenants therein. As mentioned above, a high throughput device such as a mainframe may receive data from users, tenants, other storage systems and/or networks, etc. Moreover, the data may be received as one or more virtual tape library volumes. Referring to the present description, a "tenant" may be any person or entity which submits their data to be stored and/or processed according to any of the processes of method 500, e.g., using a system as illustrated in FIG. 4.

According to an example, which is in no way intended to limit the invention, a credit card company may send one or more data volumes containing data which corresponds to multiple retail businesses. In this example, the multiple retail businesses may be considered tenants. Thus, the data volumes received from the credit card company have data from multiple tenants included therein. It follows that separating the one or more data volumes received in operation 502 according to the multiple different tenants included therein may be desired, e.g., as will soon become apparent.

Referring still to FIG. 5A, operation 504 includes extracting tenant identifiers from metadata corresponding to the received data. Again, data volumes may include data from multiple tenants. It follows that the received one or more data volumes also preferably include metadata which corresponds to each of the tenants included in each of the respective data volumes. According to one approach, metadata having the tenant identifiers may be included in a portion of a virtual tape library volume received, e.g., in a header and/or trailer of the virtual volume.

The tenant identifiers may be used to distinguish between data associated with each of the respective tenants. Accordingly, operation 506 includes separating data in the data volume into objects using the tenant identifiers from metadata. Again, each tenant identifier corresponds to portions of the data that are associated with a given tenant and may therefore be used to separate the data volume by portion according to the tenant with which it is associated (e.g., see FIG. 5B). Thus, each object preferably corresponds to a respective tenant. Moreover, once the data in the data volume has been separated into objects, method 500 proceeds to operation 508 which includes storing the objects in object storage.

Object storage provides an advanced technique of storing information, where information is stored as objects. Each object contains the data itself (e.g., the bits and bytes), in addition to metadata that may include user and/or system defined tags. The metadata may describe the content of the data; how the corresponding object is related to other objects; how the data should be handled, replicated, or backed up; etc. According to a preferred approach, the metadata for a given object includes the tenant with which the data is associated.

The separated data may be stored in object storage in view of the advancements to object storage have been developed to increase the value of object storage and increase the speed at which the data in the objects may be accessed. According to one embodiment, an embedded compute engine may be implemented in the object storage, which is typically called a "storlet". Thus, a storlet is a data storage object with a computational component stored inside, thereby enabling the object storage to perform computations to the data. This is particularly desirable when compared to the alternative conventional process of moving data to a compute node or server to perform any desired computation. According to an exemplary approach, an Openstack Swift storlet may be used. In terms of Swift object storage, dynamic large object support capability may exist which may be used to enable OpenStack Swift to separate a large object into multiple smaller objects according to fixed segment sizes, and provides the ability to reassemble the segments into one object upon receiving a read request.

A storlet may be generalized to accept different parsing modules which may be used to determine the criteria for how to parse data and separate it into sub-objects based on tenant identifiers. For example, different keys associated with a format of the data and/or the distribution of the separated data (objects) may be provided. As alluded to above, a storlet may be used to parse a data volume in order to find unique tenant records according to a parsing key which may be provided, stored in memory, etc. According to some approaches, the parsing key used to separate data based on a tenant associated therewith may be stored in a tape header and/or trailer information which may be used.

A framework may also be provided to register the computational task of the storlet along with the method for invocation. According to some approaches, the storlet can be provisioned and/or deployed on a compute node for execution by the compute node. It should also be noted that when the storlet is executed, the efficiency of executing the storlet on the compute node may depend on the type of operation the storlet performs and/or the capabilities and role of the compute node.

Performing the operations included in FIG. 5A may vary depending on where and/or how method 500 is executed (e.g., performed). For instance, the process of storing the objects in object storage may vary depending on where the data volumes are received and/or processed (separated) with respect to the location and/or implementation of the object storage.

Referring momentarily to FIGS. 4 and 5A collectively, according to one illustrative embodiment which is in no way intended to limit the invention, the one or more data volumes received in operation 502 may be received at the data processing device 404 (e.g., a virtual tape tier) from the high throughput device 402 (e.g., mainframe). It follows that the data volumes may be separated at the data processing device 404 rather than the high throughput device 402, thereby desirably conserving system resources as described above. According to one embodiment, the data processing device 404 may be a virtual tape library, and the one or more data volumes may be received using fibre connection (FICON) tape. However, any other desired type of protocol may be used in different embodiments, as would be appreciated by one skilled in the art upon reading the present description. Moreover, in some approaches a virtual tape library may have dual functionality. For instance, received data volumes may be stored in a first designated portion of memory in the virtual tape library, while the object storage may be a second designated portion of memory in the virtual tape library. Thus, once the data in the data volume has been separated into objects by the data processing device 404, the objects may be stored in the object storage at the second designated portion of memory in the data processing device 404.

With continued reference to FIGS. 4 and 5A collectively, according to another illustrative embodiment which again is in no way intended to limit the invention, the one or more data volumes received in operation 502 may be received at the distributed system 406 from the data processing device 404 (e.g., virtual tape tier) and/or the high throughput device 402 (e.g., mainframe). Accordingly, at least one program operating in the distributed system 406 may be used to perform operation 506, thereby separating the data in the volume into the objects. As described above, the at least one program may be a storlet implemented in the object storage of the distributed system 406 itself. Again, it follows that the data volumes may be separated by the distributed system 406 rather than the high throughput device 402, thereby desirably conserving system resources.

It should also be noted that, according to some embodiments, data volumes may be separated at a different location than where the separated portions are stored. For example, a virtual tape library may receive one or more virtual tape library volumes from a mainframe, the virtual tape library volumes having data from multiple tenants. The virtual tape library itself may separate the data in the virtual tape library volumes into objects, e.g., using tenant identifiers. In some approaches, the objects may be stored in the virtual tape library, e.g., in a portion of memory therein that has been designated as object storage as described above. However, in other approaches, once the data has been separated into objects, the objects may be sent to object storage at one or more different storage locations. According to one approach, the objects may be sent to object storage in a cloud-based distributed system. However, a copy of the objects may also be retained on the virtual tape library, e.g., for redundancy purposes.

Figure 5B:
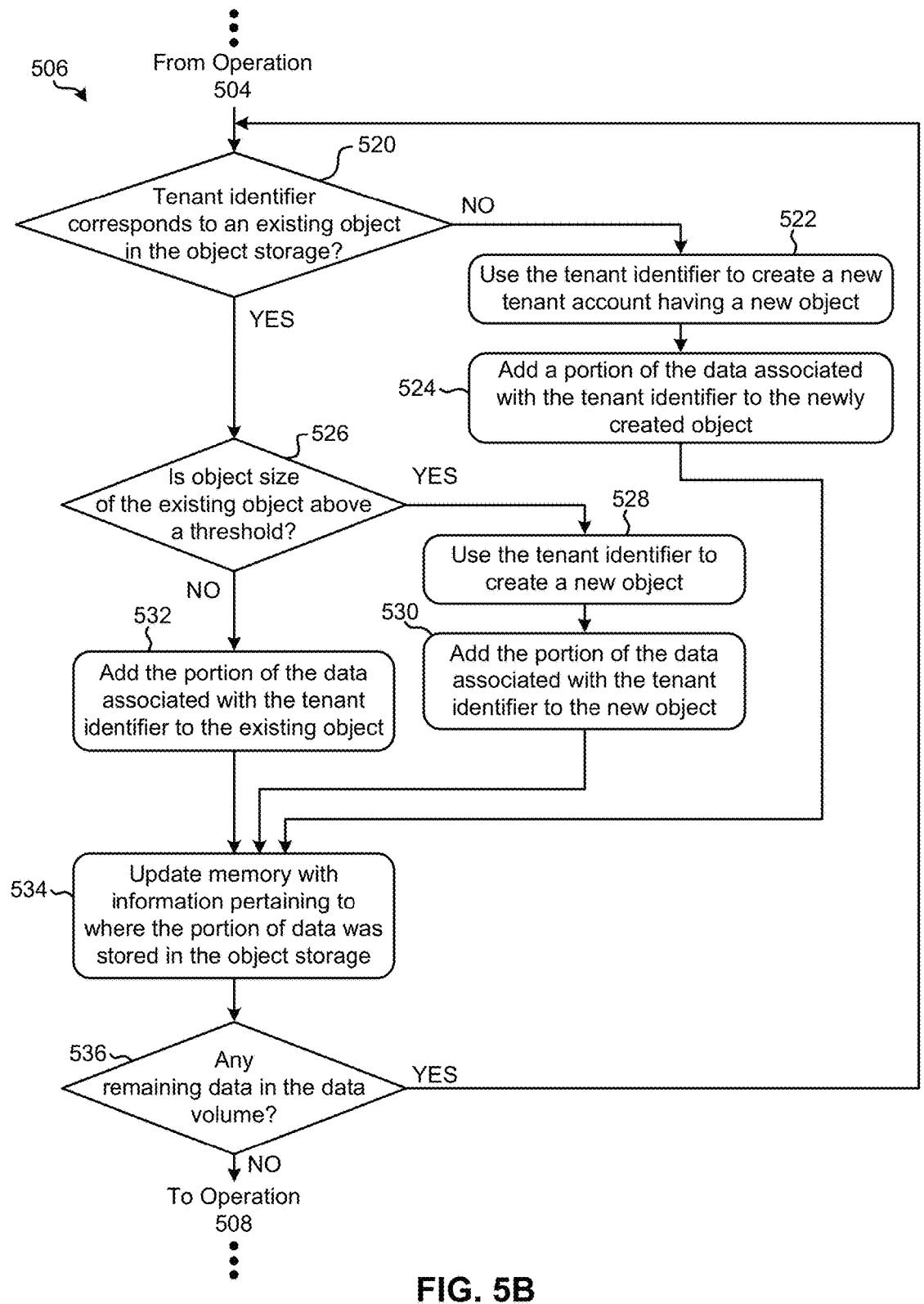
FIG. 5B is a flowchart of sub-processes for the method of FIG. 5A, in accordance with one embodiment.

Looking now to FIG. 5B, sub-processes are illustrated in accordance with one embodiment, one or more of which may be used to perform operation 506 of method 500. As presented above, operation 506 includes separating data in a data volume into objects using the tenant identifiers from metadata.

Thus, separating data as described in operation 506 may first include determining whether a given one of the tenant identifiers extracted in operation 504 corresponds to an existing object in the object storage. See decision 520. According to one approach, decision 520 may be performed by parsing a unique identifier associated with the tenant (e.g., the tenant's name) and querying the object store to see if the tenant identifier already exists in the object store. Sup-process 522 includes using the tenant identifier to create a new tenant account having a new object in response to determining that the tenant identifier does not correspond to an existing object. According to an illustrative approach, the new tenant account and new object may be created using any one or more of the sub-operations included in FIG. 5C, which will be described in further detail below.

Referring still to FIG. 5B, sub-process 524 includes adding a portion of the data associated with the tenant identifier to the newly created object. As mentioned above, data in the data volume may be separated into objects using the tenant identifiers. Thus, the portion of the data added to the newly created object may be in object form. Again, each tenant identifier correspond to portions of the data that are associated with a given tenant and may therefore be used to separate the data volume by portion to create objects.

Returning to decision 520, the flow of operation 506 proceeds to decision 526 in response to determining that the tenant identifier does correspond to an existing object. There, decision 526 determines whether an object size of the existing object is above a threshold. According to different approaches, the threshold may be predetermined, set by a user, updated over time, calculated in real-time, etc. The threshold object size may be implemented to prevent failed append operations caused by overflowing the object. However, it should be noted that "above a threshold" is in no way intended to limit the invention. Rather than determining whether a value is above a threshold, equivalent determinations may be made, e.g., as to whether a value is within a predetermined range, whether a value is outside a predetermined range, whether an absolute value is above a threshold, whether a value is below a threshold, etc., depending on the desired approach.

Sub-process 528 includes using the tenant identifier to create a new object in response to determining that the object size of the existing object is above a threshold. The object itself may be created by implementing any method which would be apparent to one skilled in the art upon reading the present description. Moreover, sub-process 530 includes adding the portion of the data associated with the tenant identifier to the new object.

Returning to decision 526, the flowchart of performing operation 506 proceeds to sub-process 532 in response to determining that the object size of the existing object is not above the threshold. There, sub-process 532 includes adding the portion of the data associated with the tenant identifier to the existing object. According to one approach, the portion of the data may be appended to an end of the object.

FIG. 5B depicts the flowchart of performing operation 506 as proceeding to sub-operation 534 from each of sub-operations 524, 530 and 532 respectively. Sub-operation 534 includes updating memory with information pertaining to where the portion of data was stored in the object storage. According to one approach, the memory updated in sub-operation 534 may be the metadata corresponding to the originally received data volume from which the portion of data was separated. According to another approach, the memory updated may be a lookup table stored in object storage, a mainframe, a virtual tape library, a cloud-based and/or WAN-based distributed system, a distributed storage location, etc.

It should also be noted that the sub-processes illustrated in FIG. 5B are preferably repeated for each of the tenant identifiers extracted from a given data volume. Accordingly, decision 536 includes determining whether any data in a data volume has yet to be separated into an object. As shown, the process of FIG. 5B returns to decision 520 in response to determining that there is data in the data volume that has not yet been separated into an object, whereby the above mentioned sub-processes may be repeated. However, the process of FIG. 5B may proceed to operation 508 of FIG. 5A in response to determining that all the data in the data volume has been separated into objects, e.g., such that the remainder of method 500 may be performed.

As mentioned above, a tenant identifier may be used to create a new object in response to determining that the tenant identifier does not correspond to an existing object (e.g., refer back to sup-process 522). Looking to FIG. 5C, exemplary sub-operations of creating a new object are illustrated in accordance with one embodiment, one or more of which may be used to perform sub-process 528 of FIG. 5B. However, it should be noted that the sub-operations of FIG. 5C are illustrated in accordance with one embodiment which is in no way intended to limit the invention.

Figure 5C:
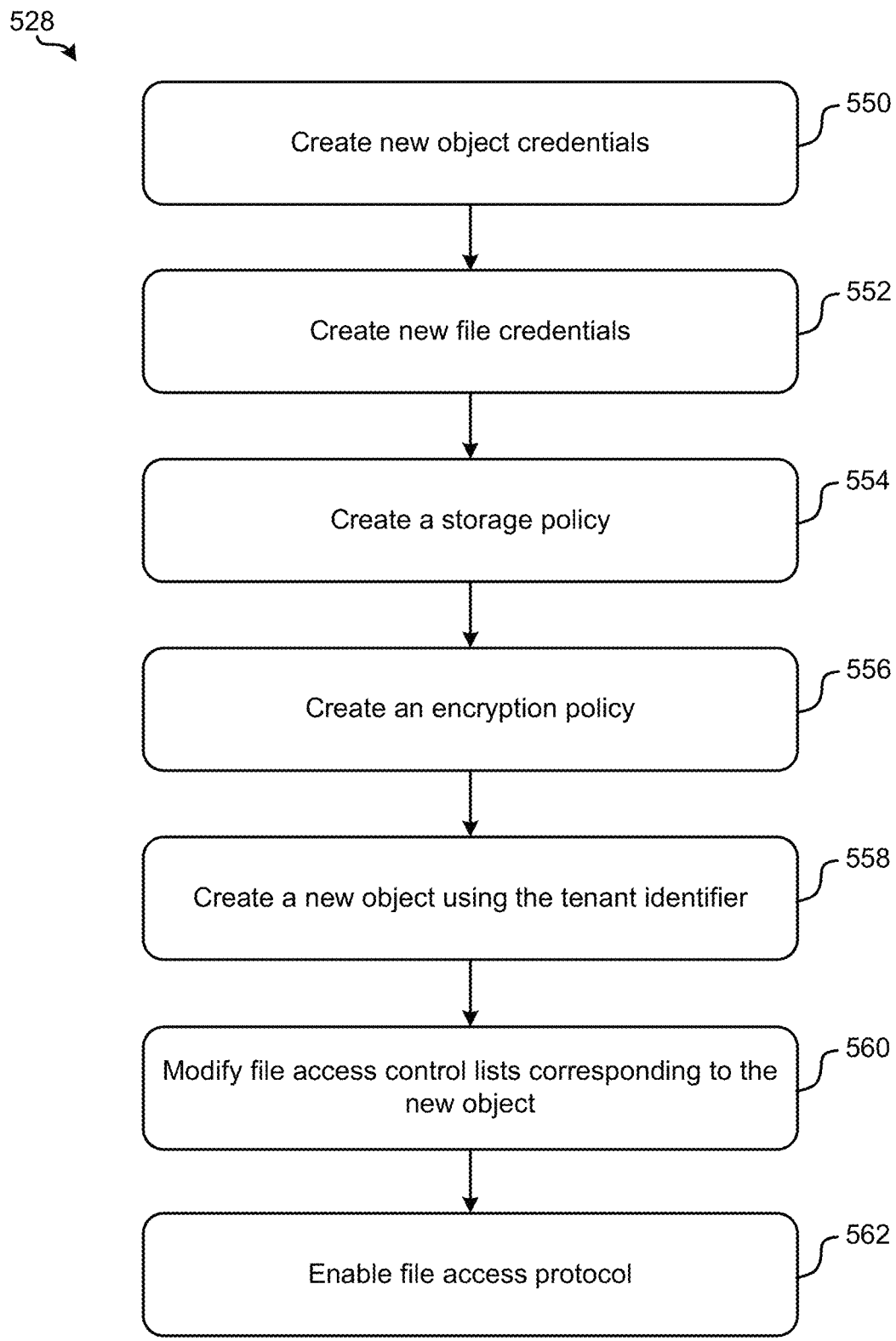
FIG. 5C is a flowchart of sub-operations for the sub-processes of FIG. 5B, in accordance with one embodiment.

As shown in FIG. 5C, sub-operation 550 includes creating new object credentials, while sub-operation 552 includes creating new file credentials. File credentials and/or object credentials may be created according to any method which would be apparent to one skilled in the art upon reading the present description. According to an example, which is in no way intended to limit the invention, creating the file credentials and/or object credentials may be achieved by leveraging a Keystone component of an Openstack Swift storlet. In another example, a Keystone server may be integrated with a Lightweight Directory Access Protocol (LDAP) server which may be integrated with spectrum scale file protocols.

The process of creating a new object may also include creating a storage policy. See sub-operation 554. A storage policy may be created by forming a unified file and object storage policy for the new tenant credentials associated with the new object. Thus, according to an illustrative approach, a spectrum scale fileset and/or new storlet device ring may be made which map to the fileset.

Sub-operation 556 also includes creating an encryption policy. In some approaches, it may be desirable that objects implemented in connection with object storage having multi-tenant compatibility are encrypted to prevent object cross-contamination. For instance, an encryption policy may be used to prevent cross-contamination of tenant specific sensitive data.

Furthermore, sub-operation 558 includes creating a new object using the tenant identifier. The new object is preferably created using the tenant record in the credentials and encryption boundaries established above. In some approaches, the tenant identifier may be a tenant specific record which does not correspond to any other objects existing in the object storage, e.g., as determined in decision 520 of FIG. 5B. Thus, the new object created using the specific tenant identifier may be unique. However, in other approaches the tenant identifier used to create a new object may correspond to an already existing object which was determined as having a size above a threshold, e.g., see decision 526.

Furthermore, sub-operation 560 includes modifying file access control lists (ACLs) corresponding to the new object created in sub-operation 558. Properly modifying the ACLs may desirably ensure that only the tenant with the right credentials is able to access the appropriate data. According to some approaches, modifying the ACLs may include adding and/or adjusting access credentials associated with a given object. Sub-operation 562 also includes enabling file access protocol, e.g., for the specific tenant account. File access protocol may be enabled using a file access protocol specified by the user. For example, a network file system (NFS) export may be configured for the fileset associated with a storage policy and/or credentials associated with a particular tenant. As mentioned above, preventing object cross-contamination is desirable for object storage having multi-tenant compatibility. According to some approaches, modifying ACLs and/or enabling file access protocol may be utilized to prevent object cross-contamination as would be appreciated by one skilled in the art upon reading the present description.

In alternate embodiments, the metadata associated with the relationship between the data volume and the corresponding sorted tenant objects may be placed in a metadata search database in the object store. According to some approaches, the metadata associated with the relationship may be placed in a new object, while in others, a Representational State Transfer (REST) Application Program Interface (API) may be extended to return this information in response to a request. According to other approaches, a virtual tape library may store the tenant to object mapping metadata for a data volume in an internal database and/or in the inodes of the data volume files in the underlying file system in the virtual tape library. Further still, in some approaches, the algorithms performed by a storlet of an object storage may be performed by a virtual tape library itself, e.g., as described above.

Various embodiments described herein may be implemented in response to a predetermined condition being met (e.g., a mainframe having received a certain amount of data), in response to receiving a request (e.g., from a host), after an amount of time has elapsed, etc. According to some embodiments, the data included in a received data volume may be separated into tenant specific objects in response to receiving a data request from one or more of the tenants to access their data. For example, a virtual tape library (e.g., see 404 of FIG. 4) may receive a plurality of data volumes from a mainframe, the data volumes including data corresponding to multiple different tenants. The virtual tape library may subsequently store the data volumes in memory. However, upon receiving a request by one of the tenants to access the data in the data volumes which corresponds to that tenant, the virtual tape library may perform any one or more of the processes included in FIGS. 5A-5C to separate the data by tenant such that the tenant's data request may be satisfied.

Moreover, once the data has been separated by tenant, the objects which correspond to a read request and/or a data access request are preferably made available as specified by the request, e.g., to the requesting tenant. This may be accomplished by transferring the objects from their storage location to a remote host location associated with the request received. This transfer of data may be accomplished using a file transfer protocol (FTP) of a type known in the art. Moreover, a customer relationship management (CRM) application may additionally be performed on the objects prior to them being transferred, e.g., depending on the desired approach.

According to other embodiments, the data included in a received data volume may be separated into tenant specific objects simply upon being received. For example, a cloud-based distributed system (e.g., see distributed system 406 of FIG. 4) may receive a plurality of data volumes from a mainframe and/or virtual tape library, the data volumes including data corresponding to multiple different tenants. The cloud-based distributed system may subsequently perform any one or more of the processes included in FIGS. 5A-5C to separate the data by tenant before distributing the data to be stored in memory. Thus, a data request from a tenant may be satisfied without having to first separate the data, thereby reducing data access time.

According to an in-use example, which is in no way intended to limit the invention, z/TPF volume processing may be shifted away from mainframe systems, to distributed systems in order to reduce processing consumption on the system as a whole. Specifically, a user may use the z/TPF application to write a substantial amount of data to a mainframe virtual tape library using a FICON tape protocol. The writing of the data may entail combining data from multiple different tenant accounts to the same virtual tape cartridges. A CRM application (e.g., Siebel) may be used to perform analytics on the data and provide value add and a competitive advantage. However, in order to ensure the processing is compliant such that accounts are separated and there is no contamination of data from different tenants, the records are preferably separated after they are initially written into the virtual tape library, but before they are provided to the CRM application. Accordingly, any one or more of the embodiments described herein may be implemented to separate the data by to tenant as described above.

Enabling distributed systems to process data volumes in secure, multi-tenant manner as described herein not only saves system resources (e.g., by reducing mainframe use), but also saves virtual tape resources. A TS7700 virtual tape may export the virtual tape library volumes as objects to an object store in a cloud-based distributed system. There, the object store may implement a storlet which separates the data included in the virtual tape library volumes into separate objects with separate access credentials and encryption according to the tenant that corresponds thereto. Each of the objects created may also have the same name as a respective volume serial (volser) number associated with each of the virtual tape library volumes. The names of the newly created tenant specific objects may be amended into the metadata of the object with the same name as the volser corresponding thereto. The objects may then be made accessible using one or more protocols such as FTP, Network File System (NFS), Common Internet File System (CMS), etc. Moreover, the protocols may be performed in the same namespace in order to seamlessly integrate with the CRM application (e.g., Siebel).

As a result, the system is able to offload the processing from the mainframe server and the TS7700 virtual tape to a distributed system, thereby minimizing data transfer and network communications. The system is also able to seamlessly integrate with the existing applications in the environment, while ensuring secure, multi-tenant, compliant processing. Further, some of the embodiments described herein may be able to leverage unified file and/or object access capabilities to make the data accessible via other protocols without having to make additional copies of it in order to do so.

Further still, flexible separation of data according to different tenant records may be achieved in a secure, multi-tenant manner. Moreover, additional custom data attributes, e.g., such as the ability to read the separated records as files using a file protocol directly without data movement after separation by tenant may also be achieved.

Again, according to an in-use example, which is in no way intended to limit the invention, a z/TPF application may transfer data to a TS7700 virtual tape over FICON tape and the TS7700 writes the data volumes containing the records into a local Spectrum Scale (GPFS) file system. However, when a tenant requests to make the z/TPF record data available to a CRM application, the TS7700 may export the data volumes to an object store (e.g., using MCStore), preferably with a 1-to-1 mapping between the data volume and the corresponding object. Upon receiving the tenant's request, the object store may invoke a storlet which separates the records in the data volume according to tenant. New multi-tenant security boundaries and objects for each set of tenant records may subsequently be created. The metadata corresponding to the original object may also be updated with the name, location, security credentials, size, etc., of the objects separated by tenant. Moreover, implementing Spectrum Scale unified file and object access may allow for the objects created by the storlet to be directly accessible via legacy file protocols by the distributed system CRM application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a data volume having data from multiple tenants therein;
   separating data in the data volume into objects using tenant identifiers from metadata corresponding to portions of the data, wherein each object corresponds to a respective tenant;
   storing the objects in object storage; and
   updating the metadata with information pertaining to the object which the data in the data volume was separated into,
   wherein separating data in the data volume into objects using tenant identifiers includes:
      determining whether a tenant identifier corresponds to an existing object in the object storage,
      using the tenant identifier to create a new tenant account having a new object in response to determining that the tenant identifier does not correspond to an existing object,
      adding a portion of the data associated with the tenant identifier to the new object,
      determining whether an object size of the existing object is above a threshold in response to determining that the tenant identifier does correspond to an existing object,
      using the tenant identifier to create a new object in response to determining that the object size of the existing object is above a threshold,
      adding the portion of the data associated with the tenant identifier to the new object, and
      adding the portion of the data associated with the tenant identifier to the existing object in response to determining that the object size of the existing object is not above the threshold.

2. The computer-implemented method of claim 1, wherein the data volume is received at a cloud-based distributed system, wherein at least one program operating in the cloud-based distributed system is used to separate the data in the volume into the objects.

3. The computer-implemented method of claim 1, wherein the data volume is received at a virtual tape library, wherein the virtual tape library separates the data in the volume into the objects.

4. The computer-implemented method of claim 1, wherein the data volume includes virtual tape library volumes received from a mainframe.

5. The computer-implemented method of claim 4, wherein the data volume is received at a virtual tape library, wherein the data volume is stored in a first designated portion of memory in the virtual tape library, wherein the object storage is a second designated portion of memory in the virtual tape library.

6. The computer-implemented method of claim 1, wherein creating a new tenant account includes:
   creating new object credentials;
   creating new file credentials;
   creating a storage policy;
   creating an encryption policy;
   modifying file access control lists; and
   enabling file access protocol.

7. The computer-implemented method of claim 1, wherein the data in the data volume is separated into objects in response to receiving a data request from one of the tenants.

8. A computer program product comprising a computer readable storage medium having program instructions embodied therewith, the program instructions executable by a processor to cause the processor to:
   receive, by the processor, a data volume having data from multiple tenants therein;
   separate, by the processor, data in the data volume into objects using tenant identifiers from metadata corresponding to portions of the data, wherein each object corresponds to a respective tenant; and
   store, by the processor, the objects in object storage,
   wherein separating data in the data volume into objects using tenant identifiers includes:
      determining whether a tenant identifier corresponds to an existing object in the object storage,
      using the tenant identifier to create a new tenant account having a new object in response to determining that the tenant identifier does not correspond to an existing object,
      adding a portion of the data associated with the tenant identifier to the new object,
      determining whether an object size of the existing object is above a threshold in response to determining that the tenant identifier does correspond to an existing object,
      using the tenant identifier to create a new object in response to determining that the object size of the existing object is above a threshold,
      adding the portion of the data associated with the tenant identifier to the new object, and
      adding the portion of the data associated with the tenant identifier to the existing object in response to determining that the object size of the existing object is not above the threshold.

9. The computer program product of claim 8, wherein the data volume is received at a cloud-based distributed system, wherein at least one program operating in the cloud-based distributed system is used to separate the data in the volume into the objects.

10. The computer program product of claim 8, wherein the data volume is received at a virtual tape library, wherein the virtual tape library separates the data in the volume into the objects.

11. The computer program product of claim 8, wherein the data volume includes virtual tape library volumes received from a mainframe.

12. The computer program product of claim 11, wherein the data volume is received at a virtual tape library, wherein the data volume is stored in a first designated portion of memory in the virtual tape library, wherein the object storage is a second designated portion of memory in the virtual tape library.

13. The computer program product of claim 8, wherein creating a new tenant account includes:
creating new object credentials;
creating new file credentials;
creating a storage policy;
creating an encryption policy;
modifying file access control lists; and
enabling file access protocol.

14. The computer program product of claim 8, comprising updating the metadata with information pertaining to the object which the data in the data volume was separated into.

15. A system, comprising:
a processor; and
logic integrated with the processor, executable by the processor, or integrated with and executable by the processor, the logic being configured to:
receive a data volume having data from multiple tenants therein;
separate data in the data volume into objects using tenant identifiers from metadata corresponding to portions of the data, wherein each object corresponds to a respective tenant; and
store the objects in object storage;
wherein separating data in the data volume into objects using tenant identifiers includes:
determining whether a tenant identifier corresponds to an existing object in the object storage,
using the tenant identifier to create a new tenant account having a new object in response to determining that the tenant identifier does not correspond to an existing object,
adding a portion of the data associated with the tenant identifier to the new object,
determining whether an object size of the existing object is above a threshold in response to determining that the tenant identifier does correspond to an existing object,
using the tenant identifier to create a new object in response to determining that the object size of the existing object is above a threshold,
adding the portion of the data associated with the tenant identifier to the new object, and
adding the portion of the data associated with the tenant identifier to the existing object in response to determining that the object size of the existing object is not above the threshold.

16. The system of claim 15, wherein the data volume includes virtual tape library volumes received from a mainframe, wherein the data volume is received at a virtual tape library, wherein the data volume is stored in a first designated portion of memory in the virtual tape library, wherein the object storage is a second designated portion of memory in the virtual tape library.

* * * * *